US 6,748,416 B2

United States Patent
Carpenter et al.

(10) Patent No.: US 6,748,416 B2
(45) Date of Patent: *Jun. 8, 2004

(54) CLIENT-SIDE METHOD AND APPARATUS FOR IMPROVING THE AVAILABILITY AND PERFORMANCE OF NETWORK MEDIATED SERVICES

(75) Inventors: Geoffrey C. Carpenter, Yorktown Heights, NY (US); German S. Goldszmidt Ziman, Dobbs Ferry, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/233,835

(22) Filed: Jan. 20, 1999

(65) Prior Publication Data

US 2002/0059429 A1 May 16, 2002

(51) Int. Cl.[7] .............................................. G06F 15/16
(52) U.S. Cl. ........................ 709/202; 709/217; 709/239
(58) Field of Search ................................ 709/238, 239, 709/242, 200, 201, 202, 217, 235; 370/235, 237, 238; 204/207, 203

(56) References Cited

U.S. PATENT DOCUMENTS

| 5,603,029 | A | * | 2/1997 | Aman et al. ................. 395/675 |
| 5,828,844 | A | * | 10/1998 | Civanlar ..................... 709/228 |
| 5,996,021 | A | * | 11/1999 | Civanlar ..................... 709/238 |
| 6,035,341 | A | * | 3/2000 | Nunally et al. .............. 709/253 |
| 6,038,594 | A | * | 3/2000 | Puente ........................ 709/217 |
| 6,058,435 | A | * | 5/2000 | Sassin et al. ................ 709/305 |
| 6,067,580 | A | * | 5/2000 | Aman et al. ................. 719/330 |
| 6,249,516 | B1 | * | 6/2001 | Brownrigg et al. .......... 370/338 |
| 6,253,230 | B1 | * | 6/2001 | Couland et al. ............. 709/203 |
| 6,360,266 | B1 | * | 3/2002 | Pettus ......................... 709/227 |
| 6,418,478 | B1 | * | 7/2002 | Ignatius et al. .............. 709/240 |

* cited by examiner

*Primary Examiner*—Dung C. Dinh
(74) *Attorney, Agent, or Firm*—Rafael Perez-Pineiro; Anne V. Dougherty (57) ABSTRACT

An intelligent local client agent can passively keep track of the state of network intermediaries, and can allocate network traffic according to different policies. In addition, an optional management platform running on a policy server provides an active network monitor of intermediaries and implements administrative policies. Under the present invention, an intermediary-aware application (e.g., a browser) will be configured to use the local client agent instead of an intermediary. The policy server can remotely load configuration information into a running client agent to provide administrative constraints or state changes. At each client agent, the intermediary servers (e.g. SOCKS servers) are ranked into tiers, so that several servers in the top-rated tier can be used concurrently to provide better performance. When the performance of a server degrades, its tier rating is lowered, and thus it may be avoided. Administratively defined tiers can be used to reserve resources for mission critical applications. Each client agent may passively collect local statistics on observed performance. The policy server may aggregate and evaluate the collected data, and use it as metrics to improve the tier groupings to the client agents, in order to provide better utilization of shared resources.

22 Claims, 7 Drawing Sheets

CLIENT-SIDE METHOD AND APPARATUS FOR IMPROVING THE AVAILABILITY AND PERFORMANCE OF NETWORK MEDIATED SERVICES

FIELD OF THE INVENTION

This invention relates generally to improving the availability and performance of network-mediated applications. More particularly, it relates to a client-based dynamic server switching method for use in a distributed system including multiple intermediary servers.

BACKGROUND OF THE INVENTION

The demand for remote networked services is steadily increasing. Many networked applications must access intermediaries in order to reach remote services. Network intermediaries include security firewalls, file caches, and directory services. For example, many corporations establish security firewalls to protect their internal networks from unauthorized access, e.g. from the Internet. At the same time, internal users need to cross these firewalls to access remote services, for instance, to access public search engines (e.g. for price comparisons in procurement). One common way to enable crossing the firewall boundaries, is for client applications (e.g. Web browsers) to access SOCKS servers. These servers are trusted network intermediaries that are enabled to communicate, across the firewalls boundaries, with remote Internet services. Typically, client applications that access remote services across the firewalls are statically configured to use only one such intermediary, e.g., a given SOCKS server. Hence, such applications become dependent on the performance and availability of the given intermediary in order to perform many of their functions. Therefore, if the SOCKS server fails, all of the Web browsers using that socks server will be unable to communicate with any remote server outside the firewalls. From the end-user perspective, connectivity to the Internet has been lost, while in fact, that is not necessarily the case, since an alternative SOCKS server may be able to provide the equivalent service at the same time.

A second problem faced by these client applications is that many of their communications are often unnecessarily being routed via intermediaries. For example, a Web browser may be statically configured to access a given SOCKS server for all remote services, even if some of these services are "inside the firewall", that is, are local to the network domain, and hence do not require access via a SOCKS server intermediary. Such requests create unnecessary load on the intermediaries, which results in additional delays for all interactions.

A third problem with prior art approaches is the lack of configurable policies to allocate constrained network resources. For example, on a bandwidth-constrained network, the download of a large news file may significantly slow all other interactions via the network. In particular, real-time applications, such as live broadcasts of multimedia streams may be unnecessarily delayed, since the current Internet infrastructure is lacking in effective priority mechanisms. It is desirable to provide a means and method for controlling the priority and pace of requests and acknowledgments of IP packets at the clients.

In order to improve the performance and availability of networked applications, multiple functionally-equivalent intermediary servers are needed to provide service to a large number of clients. It is also desirable in such a system to direct clients transparently to one of a multiplicity of intermediary servers to obtain the requested service; and, if an intermediary is not functioning as desired, the client request would ideally automatically be routed to another intermediary.

One method known in the art that seeks to increase the performance and availability of networked applications, is to create a cluster of computing nodes (also called a "multi-node cluster") to share the load. This multi-node cluster approach is particularly useful for increasing the processing capacity at "hot" sites on the Internet. For the sake of consistency herein, the term "the Internet" refers to the collection of networks and gateways that use the Transmission Control Protocol/Internet Protocol (TCP/IP) suite of protocols, TCP/IP being a well known protocol for communications between computers (see e.g., D. E. Comer, *Internetworking with TCP/IP, Principals, Protocols and Architecture*, Prentice Hall). The multi-node cluster is encapsulated, such that it is made to appear as one entity to clients, in order to make the added capacity provided by the multi-node cluster be transparent to clients. Client requests are distributed among nodes in the multi-node cluster. Many load balancing techniques are known in the art; see for example, Dias et al., "A Scalable and Highly Available Web Server", Proc. 41st IEEE Computer Society Intl. Conf. (COMPCON) 1996, *Technologies for the Information Superhighway*, pp. 85–92, Feb. 1996; see also U.S. Pat. No. 5,371,852, issued Dec. 6, 1994 to Attanasio et al., entitled "Method and Apparatus for Making a Cluster of Computers Appear as a Single Host."

A key problem with the static allocation of intermediaries is that it often results in a poorly balanced workload, thereby wasting network resources. For example, one SOCKS server can have a large number of clients simultaneously connecting to it while others are serving only a few clients. The workload across the intermediaries can become skewed and highly imbalanced, potentially causing significant performance degradation due to server overloads. In the event that an intermediary server fails or is overloaded, there is no automatic mechanism for redirecting a client to another server. A need exists, therefore, for a client-based means to automatically switch to an alternate intermediate server in order to receive remote services without interruption, in the event of service degradation or failure of a network intermediary.

Similar problems have been addressed by (1) server-side solutions, like Network Dispatcher, and (2) application-specific solutions. A server-side solution does not address the same problem, since it does not have any control over the clients. An application-specific solution can address a similar problem for a given intermediated application, at the cost of increased complexity in the application, and the intermediate servers.

What is desirable, and is an objective of the present invention, is to provide a solution to the foregoing problems, which solution is client-based and can support an arbitrary set of networked applications.

An objective of the present invention is, therefore, to provide a local client-resident intermediary broker, that can intelligently route the traffic among intermediaries so as to: (1) provide better availability of the intermediary services, (2) share the load of requests across several intermediaries (e.g. load balancing), and (3) bypass intermediaries whenever possible.

In addition, it is an objective of the present invention to provide remote administrative control of the local intermediary brokers, enabling them to utilize their shared, limited networking resources, according to specific policies. For example, important interactive data, such as e-commerce traffic can be given higher priority than non-critical information. Remote administrative control will, thereby, prevent the "tragedy of the commons" syndrome, where each client tries to locally maximize its private utilization.

Accordingly, it is yet another objective of this invention to provide an improved client-based system for accessing network intermediaries.

SUMMARY OF THE INVENTION

These and other objectives are realized by the present invention wherein a method and an apparatus are implemented as an intelligent local broker, the client agent, that can passively keep track of the state of network intermediaries, and can allocate network traffic according to different policies. In addition, an optional management platform running at a policy server provides an active network monitor of intermediaries and implements administrative policies. Under the present invention, an intermediary-aware application (e.g., a browser) will be configured to use the local client agent instead of a specific intermediary. The policy server can remotely load configuration information into a running client agent to provide administrative constraints or state changes. At each client agent, the intermediary servers (e.g., SOCKS servers, HTTP proxy caches, etc.) are ranked into tiers, so that several servers in the top-rated tier can be used concurrently to provide better performance. When the performance of a server degrades, its tier rating is lowered, and thus it may be avoided. Administratively defined tiers can be used to reserve resources for mission-critical applications. Each client agent may passively collect local statistics on observed performance. The policy server may aggregate and evaluate the collected data, and use it as metrics to improve the tier groupings to the client agents, in order to provide better utilization of shared resources.

According to the present invention, the intermediary broker automatically detects performance imbalances and/or failures (complete or partial) and dynamically switches to an alternate intermediate server in order to continue receiving the remote service with minimal disruption.

The present invention includes features for automatically and gracefully switching clients among multiple intermediate servers in the event that such an intermediate server becomes overloaded or fails. A preferred embodiment addresses the case where clients are accessing Internet services via intermediaries. The switching among intermediaries must be transparent to the client. When an intermediary server fails, the respective client agents detect the failure and automatically switch to alternate intermediary servers that continue to provide the clients Internet access.

The present invention also includes features for gracefully switching clients to alternate intermediary servers in the case of server failure or overload while maintaining a balanced workload across multiple intermediary servers in a distributed network environment.

BRIEF DESCRIPTION OF THE DRAWINGS

These, and further characteristics and features of the invention, will be more apparent from the following detailed description of a preferred embodiment and the appended drawings in which.

DESCRIPTION OF THE PREFERRED EMBODIMENT

Figure 1:
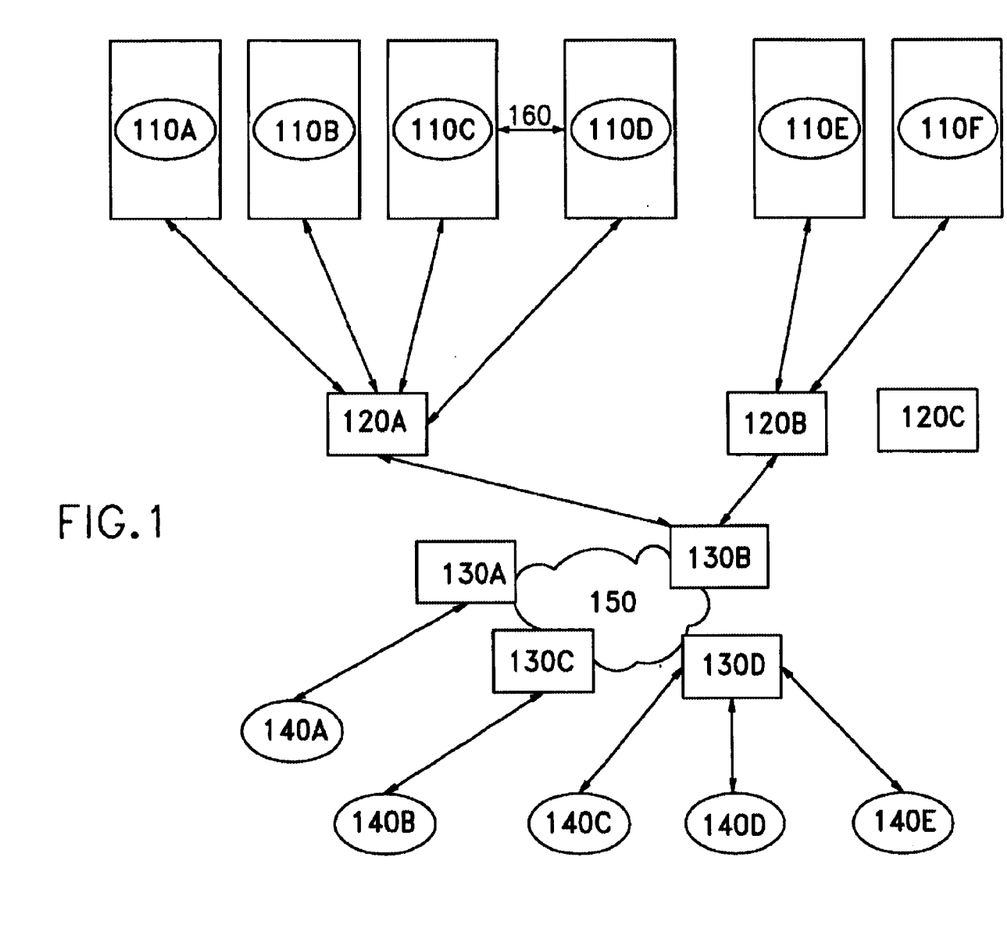
FIG. 1 depicts a prior art example, in block diagram form, of a communications environment having features that are relevant to the present invention: a set of clients requesting remote services via intermediaries.

FIG. 1 illustrates a prior art communications environment in which client locations, 110A through 110F, seek to obtain access to web site servers, 140A through 140E. SOCKS servers or other intermediary servers, 120A–120C, receive the clients' requests and establish connections across the Internet collection of hosts, 150, to the remote servers, 140A through 140E, via entry points, 130A through 130D (e.g., IP routers), to the Internet collection of hosts. As discussed in the Background of the Invention, if a particular SOCKS server, for example 120A, fails, the associated client sites, 110A–110D in FIG. 1, lose their connections to the Internet, as they are not able to alternatively access another SOCKS server, (e.g., 120B). In one prior art embodiment, an alternate site may have been designated, whereby the client site would try to access 120A and, if the attempt to connect was unsuccessful, would then try to access 120B (see: e.g., the documentation for a DNS Resolver, "RFC 882", page 28, Req. number 4). If, however, the alternative site was unavailable, or if the alternative site was heavily trafficked, the client was left with no other alternative. Furthermore, if one client site seeks to communicate with another client site (e.g., 110C and 110D), the prior art system configuration requires that such "local" communication still go through the SOCKS server, 120A, even if those sites had the capability for direct communications (as illustratively indicated by line 160).

Figure 2:
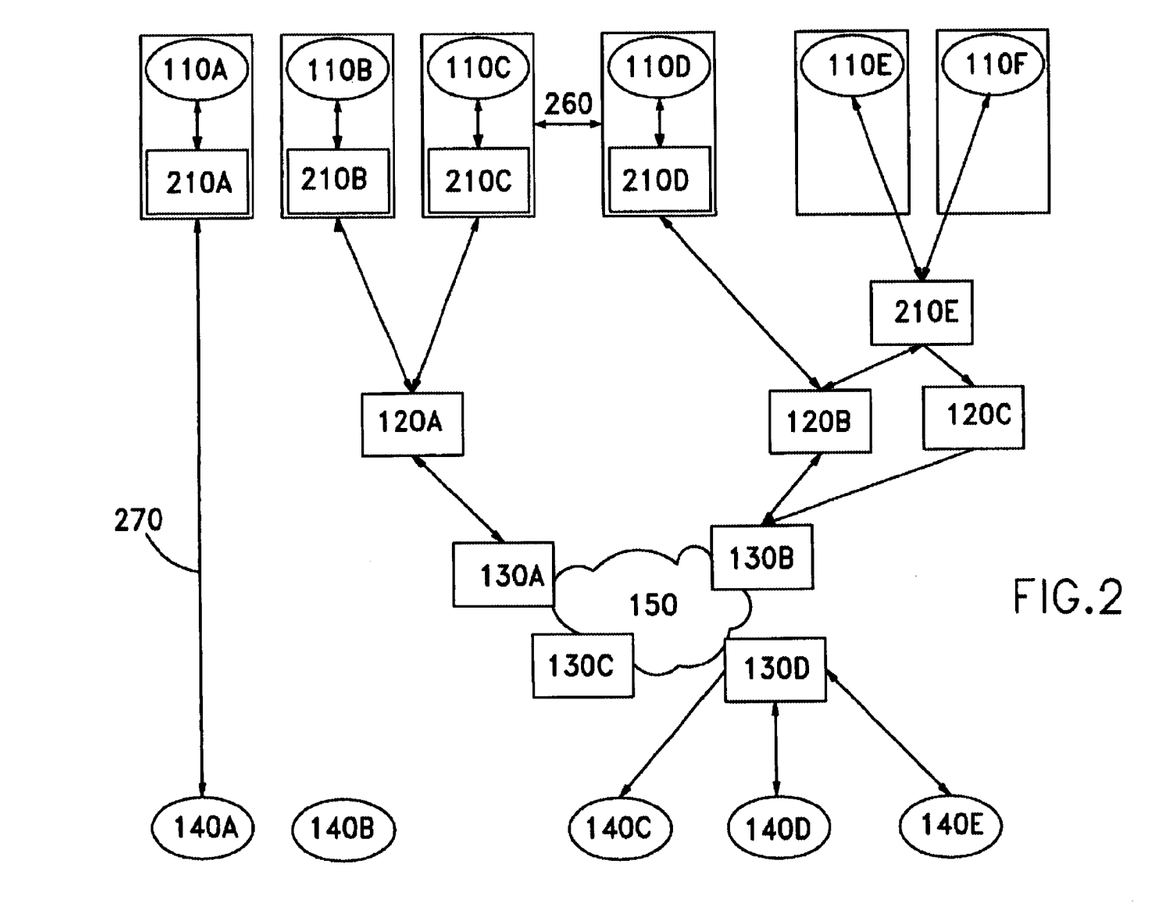
FIG. 2 depicts the communications environment of FIG. 1, augmented with an implementation of the client-agent component of the present invention.

The present invention introduces at least one client agent to the communications environment, as shown in FIG. 2. Client agents 210A through 210E, comprise components which passively monitor the state of network intermediaries, 120A–120C, and which allocate network traffic to and from the client according to different policies, as affected by such considerations as the availability of each server, a traffic prioritization scheme, etc., as further detailed below. Illustrated client agents 210A–210D are dedicated client agents which reside at each client site, 110A–110D, respectively. Client agent 210E services more than one client location, 110E and 110F, and is located at a site which is remote from each of the client locations which it serves. It is the client agents that establish communications for the client locations in response to client communications requests. Any of client agents 210A through 210E may select any of the SOCKS servers, 120A–120C, for remote communications. For local communications, the client agent may determine that it is unnecessary to go through a server for establishing communication with another client location. Therefore, as illustrated by arrow 260, communication between one client site, 110C, and another client site, 110D, will be established directly without the need to go through any intermediary. In addition, as shown by arrow 270, connection to destination 140A from the client agent 210A at client site 110A may be established directly without going through intermediaries and/or the Internet.

Each client agent has a collection of variables (e.g., stored in a table) that it maintains and consults in response to each client request. In addition, each client agent maintains a record of connections, failed and successful. Based upon the information culled from the collection of variables and the data that is to be communicated, the client agent selects the optimal communications path for the requested communication. The contents of the client agent's collection of variables may include an administratively-assigned ranking of servers, which would then indicate the preferred path or paths to the client agent for establishing communication on behalf of the client location via the highest ranked server or servers, in addition to a listing of networks/destinations which are directly reachable by that client, without the need for going through an intermediary server. Should communication with a first selected intermediary server be unsuccessful, the client agent can select a next alternative path for the requested communication, and so on, until a connection for the requested communication has been completed.

As mentioned above, each client agent's collection of variables may include administratively assigned rankings that are but one basis upon which to determine a preferred communications path. Additional considerations which may factor into the client agent's determination include load sharing performance considerations, bandwidth preservation considerations, and traffic prioritization. A primary objective of the inventive client agent is to avoid the use of intermediaries whenever such is possible. For instance, the client agent will convert a SOCKS-based connection to a direct connection to the intended destination whenever the destination is reachable without going through an intermediary socks server. This feature has the two advantages that the additional overhead of an intermediary in the request/response path is avoided; and, one can avoid the self-imposed processing limits which each intermediary necessary has. Another consideration which factors into the client agent's selection of an intermediary is the alternative paths which certain information flows can take. For example, requests to access internal web sites, intended for use by corporate employees, need not be routed through SOCKS servers. In addition, if the corporate intranet has the feature of providing transparent access, to either Internet or intranet locations, such facility is preferably chosen over a SOCKS server connection.

Yet another consideration is the existence of intermediaries that provide augmented content when a web page is retrieved, such as suggestions about other sites, etc. Such an intermediary may only need to process a subset of the content being delivered to the web browser (e.g., HTML content) with other content being useless to such an intermediary. Based upon the request from the client, client agents can intelligently separate the different data flows so that only relevant data is received by the specialized intermediary, while all other content flows through different intermediaries, thereby reducing the load on the specialized intermediaries and improving the performance retrieval.

Yet another criteria for connection is traffic prioritization that the client agent can perform based on the nature of the data to be received in response to the request. For example, bulk data transfer can be given a lower priority, while interactive traffic (like a Telnet session) can be given a higher priority. Higher priority traffic is given precedence over traffic of a lower priority. The client agent may make any of the foregoing determinations based upon learning from the history of data retrieved for prior requests or based upon administratively-assigned rules.

Figure 3:
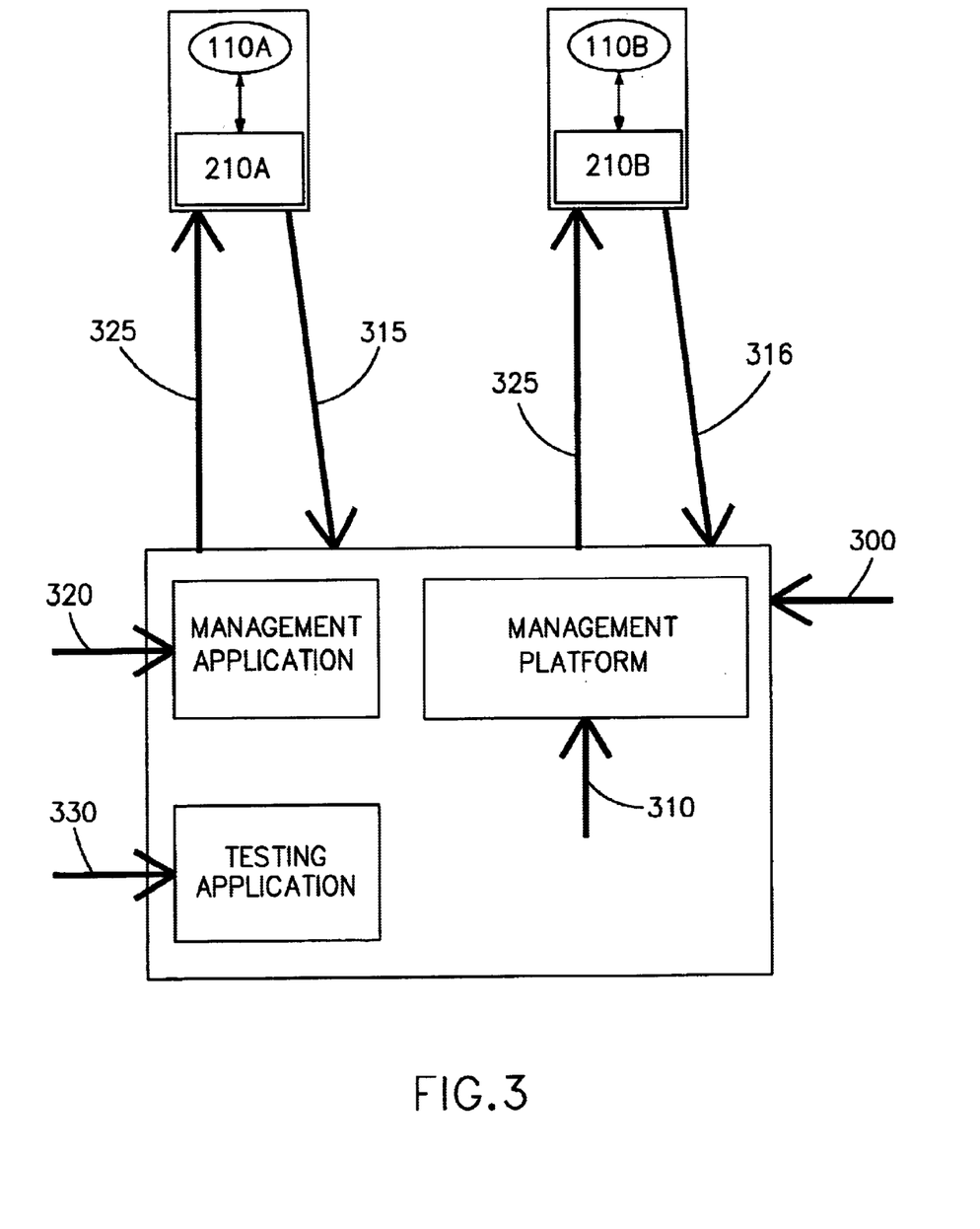
FIGS. 3 depicts the client-agents interacting with the policy server component of the present invention.

In a preferred embodiment of the invention, the ranking and rules found in a client agent's table of variables are dynamically maintained. While the present invention is resilient in the fact that a client agent can select alternative paths based on real-time information (i.e., after an attempt to establish a path through a certain server has been unsuccessful), it is also desirable to continually update the table to reflect the ever-changing realities of the communications environment. After trying unsuccessfully to establish communication through a chosen intermediary, or after a pre-set number of unsuccessful attempts to access the destination in the chosen path, the client agent may update its own variable information to lower the ranking of the unavailable intermediary. What is additionally desirable is to share such information with other client agents in the network. FIG. 3 illustrates a network component, referred to hereinafter as the management platform, 310, is ideally located at each of the host servers, 300 (also referred to as "control servers" or "policy servers"), with which the client locations are associated. The management platform registers with each client agent to receive communications, 315 and 316, from each of the client agents, 210A and 210B, respectively, and to utilize the content of those communications to render revised rules, network policies, and rankings, with such revision being conducted by the one or more management applications, 320, running on the management platform. The revised information is then communicated, shown as 325, to all associated client agents. In addition to utilizing the network information provided by the client agents, the management platform is provided with a proactive testing application 330 that can actively poll intermediaries to evaluate such features as availability (i.e., not in failure mode), load, changing protocols, etc. Such information will be used by application 320 to revise rules, policies and rankings to then be communicated, again at 325, to the client agents. For example, when any of the intermediary servers is noticed to have a performance problem, its tier ranking is lowered.

The management platform at each control server monitors for significant changes in the state of the intermediary servers, such as failures or overloads, or when a previously failed intermediary returns to service. The control server will periodically send messages to the client agents to inform them of such configuration changes (e.g., "use SOCKS server S1 and S3, but not S2"). This allows clients to respond to performance problems, even if they are not currently using the intermediary servers.

Figure 4A:
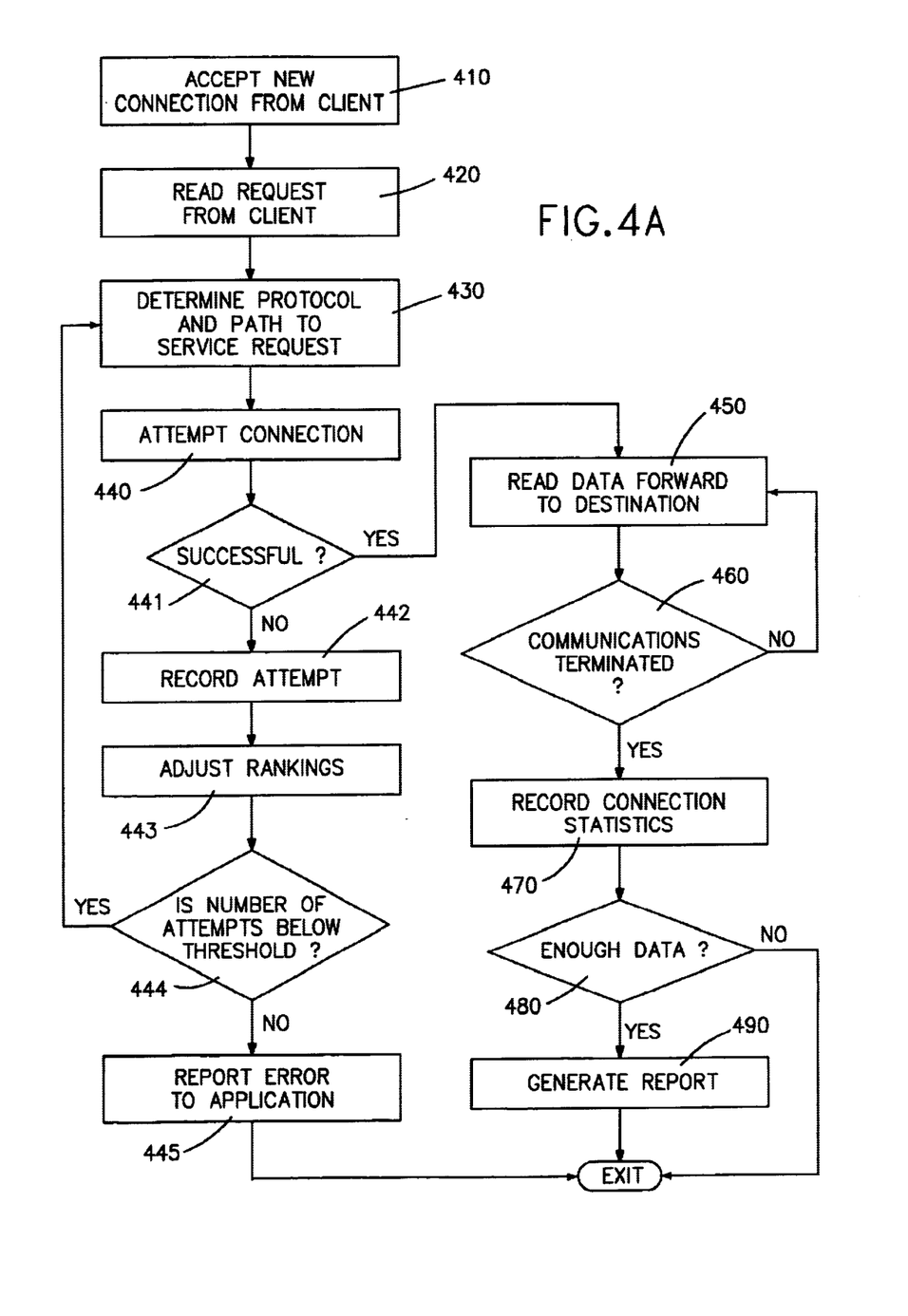
FIGS. 4A and 4B depict a representative process flow conducted by the client agent of the present invention for selecting intermediaries for remote services.
Figure 4B:
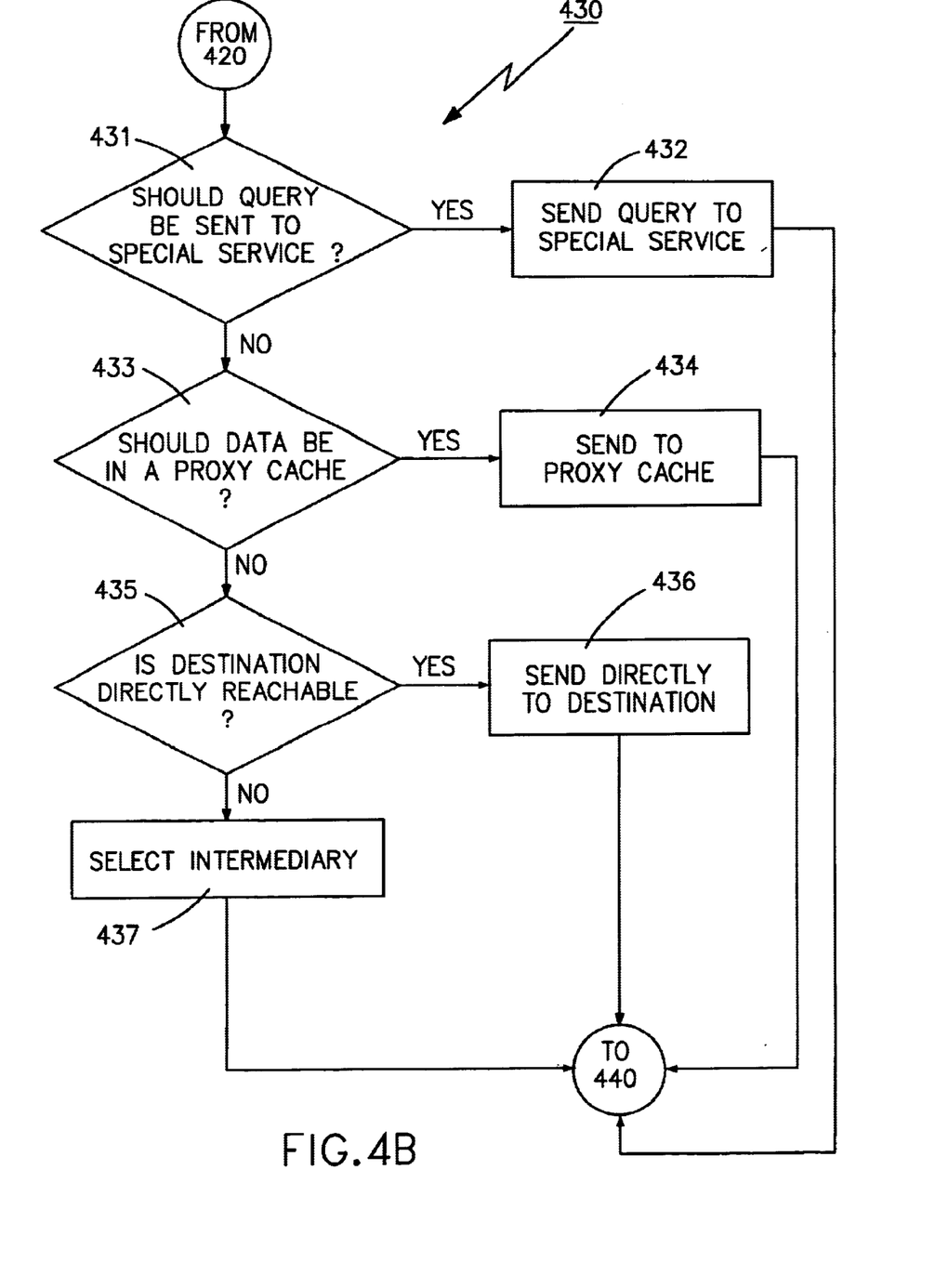

The operations of the inventive components will now be detailed. FIGS. 4A and 4B provide the representative flow for a client agent processing client requests. At step 410 the client agent accepts a new connection from the client. Next, at 420, the client agent reads the request information provided by the client. This request indicates the application that is to be invoked to establish the communication (e.g., Netscape Navigator, Telnet, FTP, etc.), the protocol used to make the request, the source address/port, the destination server address/port, and the request data (e.g., the URL for the data to be retrieved. Next, at 430, the client agent determines what protocol and path should be used to service the request, based upon the content of the request, including the destination, the protocol and nature of the requested data.

Specifically, as detailed in FIG. 4B, the client agent determines at 431 whether the query should be sent through a special service (e.g., data suitable for annotation should be retrieved via an augmenting service), and, if so, directs the requested communication through that special service provider at 432. It is next determined, at 433, if the request is for data that would be provided to a proxy cache, and, if so, the requested communication is routed through an HTTP proxy cache at step 434. Finally, it is determined, at step 435, if the destination can be reached directly. If the end destination is a local network, as determined at step 435, the communication is routed directly to the destination, bypassing any intermediary. If, however, the end destination is not local, as indicated by a "no" determination at decision box 435, the client agent must select the optimal intermediary at step 437. Upon completion of the step for determining the protocol and path, the client agent attempts to make the connection to the intermediary at step 440. Selecting the optimal intermediary includes consulting the table of variables including rankings in conjunction with weighing such factors as administratively dictated rules, traffic prioritization, etc.

After a path has been selected, the client agent attempts to make a connection with the selected intermediary, at step 440. If a connection is made, as determined at step 441, the client agent reads data from the client or from the service provider and forwards same to the corresponding endpoint at step 450. If, however, the connection cannot be made successfully, as indicated by a "no" response at 441, the client agent records the unsuccessful attempt at step 442, optionally adjusts rankings at 443, and returns to step 430 to select another intermediary. For a given request, it will not be necessary for the client agent to repeat steps 431, 433 an 435; such, that the client agent can go directly to step 437 at this point in the processing. It is also to be noted that the client agent could be implemented to identify backup connection paths, such that a return to step 430 would simply involve accessing a next entry in a list which was created at the first iteration of step 437. The client agent may count unsuccessful attempts and "time out" at 444 if no possible intermediary can be selected, in which case, the client is informed of the failure at 445 and the client agent process terminates. once connection is established, data is exchanged at step 450 until it is determined, at step 460, that the communication has been terminated, either intentionally (e.g., at the end of a file) or unintentionally (e.g., system failure). When the communication has been terminated, statistics associated with the connection are recorded, at step 470, by the client agent, including such information as the bytes transmitted per second, the total data transferred, the connection establishment time, etc. After a threshold amount of recorded information has been gathered, which is a local determination at step 480 based on an assumption that no system could tolerate continual updates, the updated recorded information is provided at step 490 to all interested entities on the network. Specifically, when a management platform is available, the client agent provides the information to the management platform on the control server with which it is associated.

Figure 5:
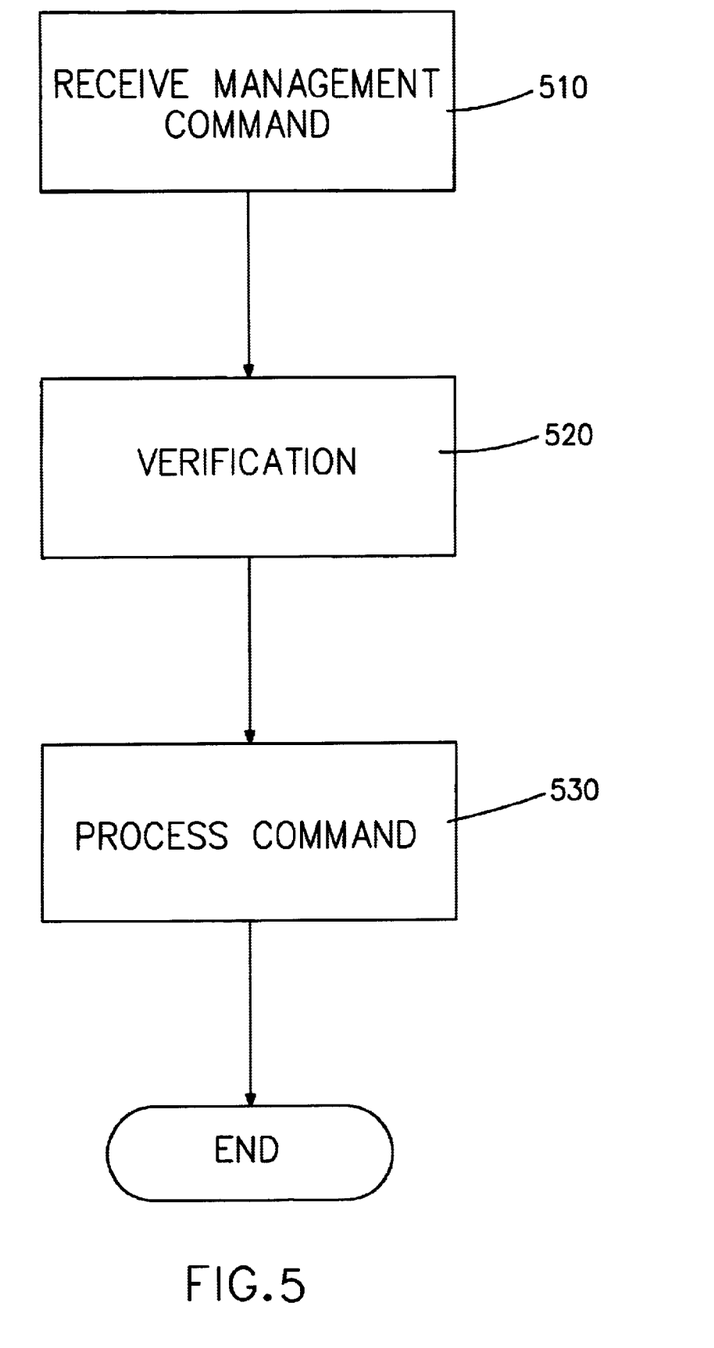
FIG. 5 depicts a method for receiving and processing management commands from a policy server at a client agent.

As noted above, the client agent may use the information locally to update its own tables, particularly in the inventive embodiment in which there is no management platform to coordinate system inputs and communicate that information to the client agents. Alternatively, the information is provided to, and updated table information is received from, the management platform. FIG. 5 illustrates a process flow followed by a client agent that is associated with a control server having the inventive management platform running. At step 510, the client agent receives a management communication (325 from FIG. 3), followed by verifying that the communication is valid at step 520. Verification may be done by comparing a password or other unique identifier to one stored at the client for the registered control server. Absent some verification step, it may be possible for non-authorized entities to affect the routing of communications to and from the client. Once verification has been successfully completed, the client agent processes the management command at step 530, usually by updating its table of variables with new ranking information, updating new server information, adjusting time-out parameters, adding new subscriptions to the client agent from other applications associated with the management platform, etc.

Figure 6:
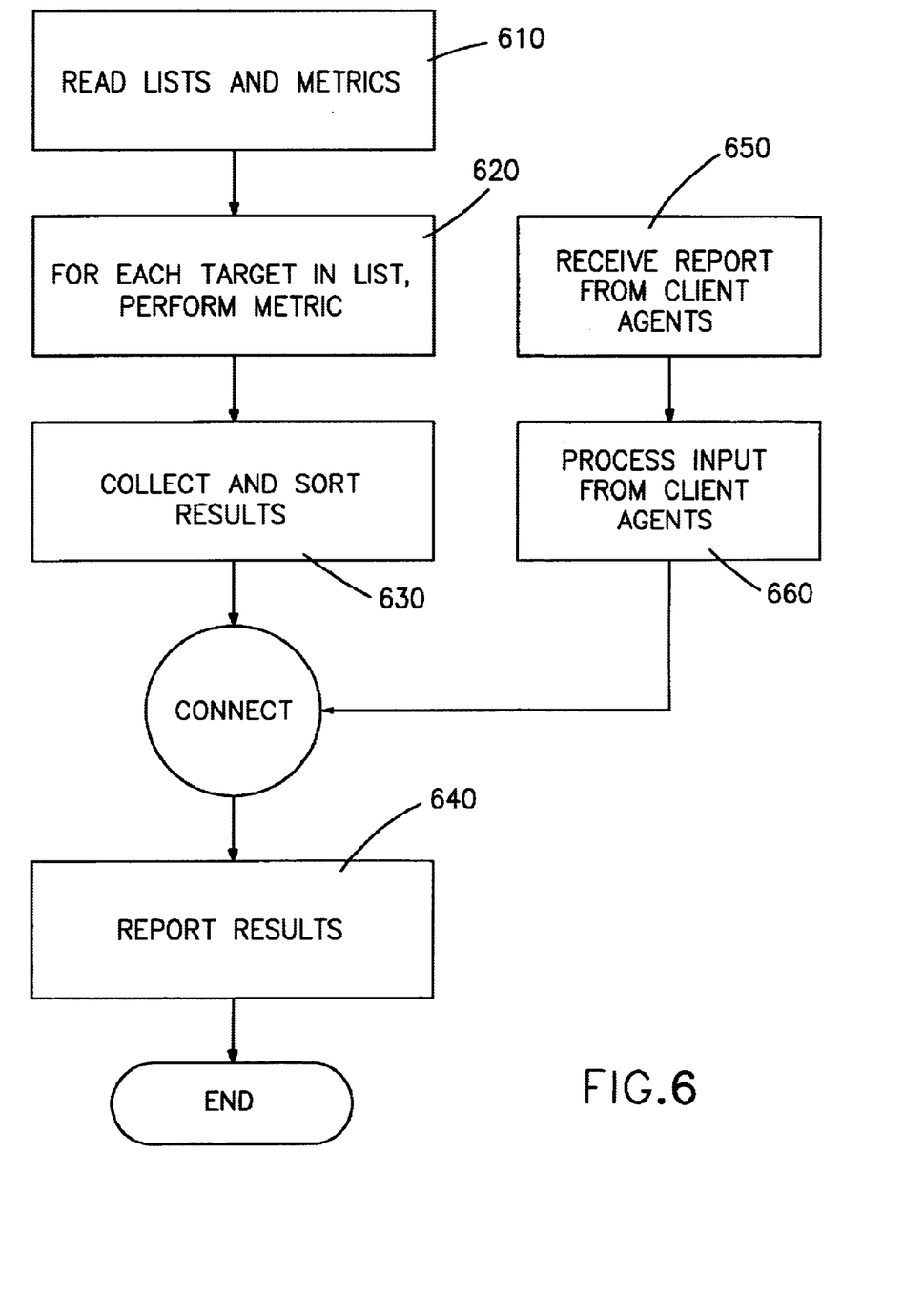
FIG. 6 depicts a method for a management application to evaluate metrics of intermediaries and to receive and process input from client agents.

As discussed previously with reference to FIG. 3, log information is periodically collected from client agents at the control servers in the form of communications 315 and is utilized by the management platform along with information that is actively collected. FIG. 6 shows a representative process flow for the management platform at a control server location. At step 610, the management application reads lists and metrics, followed by performing a metric for each target server in the list, at step 620. Such active monitoring would ideally be conducted periodically. Results of the metrics are collected and sorted (i.e., rankings adjusted) at step 630. Concurrently with the active monitoring, the control server receives input from the client agents at 650. The client agent input is processed, at step 660. As will be apparent to one having skill in the art, the processing of actively and passively obtained server information may be conducted in a single processing step, rather than the two illustrated steps. Finally, any changes to the rankings, protocols, etc. are reported to the client agents at step 640.

The first advantage of the present method is that it is client-resident, and depends solely on the availability of the client. A second advantage is that it is portable, that is, does not require any changes to the applications' code, nor to the network interfaces on the computer hosts. A third advantage is that it provides dynamic reconfiguration of resource allocation, based on administrative policies of the client-side organizations. In contrast, server-side solutions can only implement server-side policies. A fourth advantage is that the present solution allows for traffic priorities, which depend on client-side specific policies.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A method for a client agent resident at a client computer to establish communication between the client location and a destination location comprising the steps of:
   receiving a request for communication from said client location said request specifying a destination for the communication;
   analyzing the content of said communication request, said content comprising at least one of the application to be invoked for processing said communication request, the protocol used to make the request, and the identification of the requested data;
   determining an optimal communication path based on said analyzing; and
   attempting to establish communications along said optimal path.

2. The method of claim 1 additionally comprising the steps of:
   when communications cannot be established along said optimal path, selecting a successive alternative path;
   trying to establish communication along said alternative path; and
   repeating said selecting and trying until communication between said client location and said destination has been established.

3. The method of claim 1 wherein said determining optimal path comprises determining whether the request should be sent to a special service location based on said analyzing of content, and wherein said optimal communication path includes said special service location.

4. The method of claim 1 wherein said determining optimal path comprises determining if said data should be routed to a proxy cache and wherein said optimal communication path includes said proxy cache.

5. The method of claim 1 wherein said determining comprises ascertaining whether said communication between said client location and said destination can be made without accessing an intermediary location.

6. The method of claim 3 wherein said determining optimal path further comprises determining if said data should be routed to a proxy cache and wherein said optimal communication path includes said proxy cache.

7. The method of claim 3 wherein said determining optimal path further comprises ascertaining whether said communication between said client location and said destination can be made without accessing an intermediary location.

8. The method of claim 6 wherein said determining optimal path further comprises ascertaining whether said communication between said client location and said destination can be made without accessing an intermediary location.

9. The method of claim 4 wherein said determining optimal path further comprises ascertaining whether said communication between said client location and said destination can be made without accessing an intermediary location.

10. The method of claim 1 wherein said determining an optimal path comprises selecting one of a plurality of intermediary server locations for routing said communication.

11. The method of claim 10 further comprising the step of maintaining at least one record comprising a ranking of said plurality of intermediary server locations and wherein said determining an optimal path comprises consulting said at least one record and selecting one of said plurality of intermediary server locations for said communication.

12. The method of claim 1 wherein said client agent is adapted to receive communication information from at least one management server, and wherein said determining an optimal communication path additionally comprises consulting said communication information and selecting said path based on said content of said request and said communication information.

13. The method of claim 11, wherein said client agent is adapted to receive communication information from at least one management server, further comprising receiving communication information from said management server and updating said ranking based on said communication information.

14. The method of claim 13 additionally comprising the steps of:
    when communications cannot be established along said optimal path, selecting a successive alternative path;
    trying to establish communication along said alternative path;
    repeating said selecting and trying until communication between said client location and said destination has been established; and
    notifying said management server about said communication.

15. A client resident client agent for establishing communications between a client location and a destination location comprising:
    receiver component for receiving a request for communication from said client location said request specifying the destination for the communication;
    processing means for analyzing the content of said communication request information, said content comprising at least one of the application to be invoked for processing the communication request, the protocol used to make the request, and the identification of the requested data, and for determining an optimal communication path based on said analyzing; and
    communication component for attempting to establish communications along said optimal path.

16. The client agent of claim 15 further comprising record maintenance means for maintaining at least one record comprising a ranking of said plurality of intermediary server locations.

17. The client agent of claim 15 wherein said receiver component is further adapted to receive communication information from at least one management server.

18. The client agent of claim 16 wherein said receiver component is further adapted to receive communication information from at least one management server, said communication information being used by said record maintenance means for updating said ranking.

19. The client agent of claim 17 wherein said communication component is additionally adapted to inform said management server about communications at said client agent.

20. A communication system for a first client computer location to establish communication with at least one other computer location comprising:
    at least one client resident client agent associated with said first client computer location, said client agent comprising: receiver component for receiving a request for communication from said client location said request specifying the destination for the communication; processing means for analyzing the content of said communication request, said content comprising at least one of the application to be invoked for processing said communication request, the protocol used to make the request and the identification of the requested data, and for determining an optimal communication path based on said analyzing; and communication component for attempting to establish communications along said optimal path; and
    at least one management server for sharing communication information with said at least one client agent.

21. An article of manufacture comprising:
    a computer usable medium having computer readable program code embodied therein for establishing communication between a client location and a destination location, the computer readable program code in said article of manufacture being executed at the client location and comprising:
    computer readable program code for receiving a request for communication from said client location said request specifying the destination for the communication;
    computer readable program code for analyzing the content of said communication request, said content comprising at least one of the application to be invoked for processing the communication request, the protocol used to make the request, and the identification of the requested data;
    computer readable program code for determining an optimal communication path based on said analyzing; and
    computer readable program code for attempting to establish communications along said optimal path.

22. The article of manufacture of claim 21 further comprising computer readable code for causing the computer to maintain at least one record comprising a ranking of said plurality of intermediary server locations and wherein said determining an optimal path comprises consulting said at least one record and selecting one of said plurality of intermediary server locations for said communication.

* * * * *